(12) United States Patent
Phelan et al.

(10) Patent No.: US 11,068,414 B2
(45) Date of Patent: Jul. 20, 2021

(54) PROCESS FOR MAINTAINING DATA WRITE ORDERING THROUGH A CACHE

(71) Applicant: VMware, Inc., Palo Alto, CA (US)

(72) Inventors: Thomas A. Phelan, San Francisco, CA (US); Erik Cota-Robles, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/456,590

(22) Filed: Jun. 28, 2019

(65) Prior Publication Data

US 2019/0324922 A1 Oct. 24, 2019

Related U.S. Application Data

(63) Continuation of application No. 13/488,983, filed on Jun. 5, 2012, now Pat. No. 10,387,331.

(51) Int. Cl.
*G06F 12/12* (2016.01)
*G06F 12/123* (2016.01)
*G06F 12/0895* (2016.01)

(52) U.S. Cl.
CPC ........ *G06F 12/123* (2013.01); *G06F 12/0895* (2013.01); *G06F 2212/621* (2013.01)

(58) Field of Classification Search
CPC ............. G06F 19/3412; G06F 19/3468; G06F 11/0745; G06F 11/0757; G06F 11/076; G06F 11/10; G06F 11/2215; G06F 12/00; G06F 12/02; G06F 12/08; G06F 12/084; G06F 12/0891; G06F 12/14; G06F 17/30; G06F 8/433; G06F 17/2211;
(Continued)

(56) References Cited

U.S. PATENT DOCUMENTS 5,369,757 A * 11/1994 Spiro ................... G06F 11/1471
714/19
5,561,783 A * 10/1996 Vanka ................. G06F 12/0804
710/57

(Continued)

OTHER PUBLICATIONS

Incremental Commit Groups for Non-Atomic Trace Processing by Yourst (Year: 2005).*

(Continued)

*Primary Examiner* — Paul M Knight
(74) *Attorney, Agent, or Firm* — Thomas | Horstemeyer, LLP (57) ABSTRACT

A cache is maintained with write order numbers that indicate orders of writes into the cache, so that periodic partial flushes of the cache can be executed while maintaining write order consistency. A method of storing data into the cache includes receiving a request to write data into the cache, identifying lines in the cache for storing the data, writing the data into the lines of the cache, storing a write order number, and associating the write order number with the lines of the cache. A method of flushing a cache having cache lines associated with write order numbers includes the steps of identifying lines in the cache that are associated with either a selected write order number or a write order number that is less than the selected write order number, and flushing data stored in the identified lines to a persistent storage.

20 Claims, 11 Drawing Sheets

(58) Field of Classification Search
CPC ............ G06F 17/30705; G06F 12/123; G06F 12/0895; G06F 2212/621; G06F 12/12
See application file for complete search history.

(56) References Cited

U.S. PATENT DOCUMENTS

| | | | | |
|---|---|---|---|---|
| 5,696,917 | A * | 12/1997 | Mills | G06F 12/0607 711/1 |
| 5,742,597 | A * | 4/1998 | Holt | H04L 49/254 370/390 |
| 5,848,283 | A * | 12/1998 | Moore | G06F 12/0831 712/40 |
| 5,895,488 | A * | 4/1999 | Loechel | G06F 12/0804 711/135 |
| 6,412,045 | B1 * | 6/2002 | DeKoning | G06F 12/0804 711/133 |
| 6,470,329 | B1 * | 10/2002 | Livschitz | G06F 16/9014 |
| 6,546,462 | B1 * | 4/2003 | Palanca | G06F 12/0804 711/135 |
| 6,578,041 | B1 * | 6/2003 | Lomet | G06F 11/1466 |
| 6,898,587 | B2 * | 5/2005 | Messinger | G06F 16/2365 707/703 |
| 7,310,712 | B1 * | 12/2007 | Gordon | G06F 12/0802 711/161 |
| 7,356,679 | B1 * | 4/2008 | Le | G06F 9/45558 713/1 |
| 7,752,173 | B1 * | 7/2010 | Gole | G06F 12/0804 707/654 |
| 7,849,462 | B2 * | 12/2010 | Traut | G06F 9/455 718/1 |
| 8,234,478 | B1 * | 7/2012 | Roberts | G06F 12/0895 711/167 |
| 8,661,507 | B1 * | 2/2014 | Hesselink | H04L 63/0209 726/2 |
| 2002/0062336 | A1 * | 5/2002 | Teodosiu | H04L 67/104 709/201 |
| 2003/0159007 | A1 * | 8/2003 | Sawdon | G06F 11/1466 711/154 |
| 2003/0210248 | A1 * | 11/2003 | Wyatt | G06F 12/0888 345/541 |
| 2003/0212865 | A1 * | 11/2003 | Hicken | G06F 12/0804 711/135 |
| 2004/0111557 | A1 * | 6/2004 | Nakatani | G06F 16/10 711/113 |
| 2005/0022175 | A1 * | 1/2005 | Sliger | G06F 8/658 717/169 |
| 2005/0240632 | A1 * | 10/2005 | Wong | G06F 16/128 |
| 2005/0278486 | A1 * | 12/2005 | Trika | G06F 12/0804 711/142 |
| 2006/0026460 | A1 * | 2/2006 | Goldberg | G06F 11/2074 714/6.13 |
| 2006/0047925 | A1 * | 3/2006 | Perry | G06F 11/1474 711/162 |
| 2006/0047999 | A1 * | 3/2006 | Passerini | G06F 11/1458 714/6.12 |
| 2006/0117075 | A1 * | 6/2006 | Cowan | G06F 8/71 |
| 2007/0033356 | A1 * | 2/2007 | Erlikhman | G06F 11/1456 711/162 |
| 2007/0192544 | A1 * | 8/2007 | Frolund | G06F 11/183 711/135 |
| 2007/0260653 | A1 * | 11/2007 | Jaffri | H04L 69/04 |
| 2007/0271431 | A1 * | 11/2007 | Hwang | G06F 11/1471 711/162 |
| 2008/0046736 | A1 * | 2/2008 | Arimilli | G06F 12/0888 713/176 |
| 2008/0189535 | A1 * | 8/2008 | Agarwal | G06F 9/3842 712/245 |
| 2009/0228429 | A1 * | 9/2009 | Diaconu | G06F 16/1865 |
| 2009/0300646 | A1 * | 12/2009 | Wagner | G06F 9/541 719/312 |
| 2010/0082550 | A1 * | 4/2010 | Cong | G11C 7/1006 707/672 |
| 2010/0318713 | A1 * | 12/2010 | Deshpande | G06F 13/385 710/308 |
| 2010/0325367 | A1 * | 12/2010 | Kornegay | G06F 12/0804 711/143 |
| 2011/0119240 | A1 * | 5/2011 | Shapira | G06F 16/10 707/693 |
| 2011/0246869 | A1 * | 10/2011 | Vion-Dury | G06F 40/194 715/229 |
| 2012/0079207 | A1 * | 3/2012 | Yochai | G06F 11/1469 711/141 |
| 2013/0091331 | A1 * | 4/2013 | Moraru | G06F 12/126 711/143 |

OTHER PUBLICATIONS

Cache Memory; Exclusive vs Inclusive Published Jun. 2009 at http://cachememorydesign.blogspot.com/2009/06/exclusive-versus-inclusive.html.

AMD Programmers Manual; Revision 3.12; Sep. 2006.

The Cache Memory Book, Second Edition by Jim Handy; Academic Press 1998, pp. 7-8, 42-43, 57, and 64.

The Authoritative Dictionary of IEEE Standards Terms, 7th Edition; IEEE 2000.

High Speed On-Line Backup When Using Logical Log Operations by Lomet; ACM 2000.

* cited by examiner

PROCESS FOR MAINTAINING DATA WRITE ORDERING THROUGH A CACHE

CROSS-REFERENCE TO RELATED APPLICATIONS

This application is a continuation of and claims the benefit of U.S. patent application Ser. No. 13/488,983, filed Jun. 5, 2012 and entitled "Process for Maintaining Data Write Ordering through a Cache," which is incorporated entirely herein by reference.

BACKGROUND

Demands for increased data storage speed, capacity, and general availability have been spurred on by a variety of services that are available to users over the Internet, such as photo and video sharing websites, e-mail providers that offer unlimited email storage space, and service providers that host virtual machines (VMs). The data storage demands of VM service providers are especially challenging due to the nature of the services that they offer, which typically include storing persistent images of the VMs, storing virtual disks accessed by the VMs, and storing various snapshots of the VMs/virtual disks to preserve their state at different points in time. Such storage demands are exacerbated when the VM service providers take measures to ensure the integrity of the data and the availability thereof to their customers, which is typically accomplished by redundantly storing the data across different storage devices, and, in some cases, storing copies of the data across data centers in different geographic locations.

In order to provide the aforementioned services to their customers, VM service providers must typically purchase and configure a large number of server devices (e.g., rack-mounted blade servers) and storage devices (e.g., Storage Area Network (SAN) systems). Such devices are commonly referred to as "enterprise devices," which are expensive, complicated to configure, and require frequent maintenance. As a result, both the upfront and recurring overhead costs incurred by the VM service providers are quite high, which reduces profitability. Moreover, scaling enterprise devices to meet evolving customer demands can be difficult to accomplish, which may result in a disruption of the services that are expected by customers to be highly-available.

In an attempt to mitigate the foregoing problems associated with enterprise storage devices, many VM service providers have turned to renting storage space from data storage services provided over a network by a cloud services provider, such as the Simple Storage Service (S3) provided by Amazon.com. These storage services are desirable since they provide reliable access to a virtually unlimited amount of storage space with little or no upfront costs and eliminate the complexities of managing enterprise storage devices. One drawback, however, of using such storage services is that the data stored therein typically can only be accessed over an Internet connection. As a result, data transfers between the VM service provider and the storage service provider are relatively slow.

One attempt to alleviate this problem involves caching data on a local storage device maintained by the VM service provider and periodically "flushing" that data out to the storage service for backup. Unfortunately, most storage services require all data flushes to be atomic, i.e., all data involved in a data flush must be transmitted to and stored by the storage service, or the data flush is voided. This requirement is problematic when attempting to flush large files such as snapshots of VMs, which can be gigabytes in even terabytes in size—since the slow and unreliable nature of Internet connections result in a significantly reduced rate at which the snapshots can be flushed-out to the storage service in comparison to locally-accessible enterprise storage devices. Consequently, there is an increase in the potential amount of data that will be lost in the event of a crash of the local storage device cache failure.

SUMMARY OF THE INVENTION

Accordingly, disclosed herein is a technique for implementing a partial cache flush technique that enables portions of a data file to be flushed from a local storage device cache and into a persistent storage device at various points in times in a "write order consistent" manner, as a result of which the portions flushed to the persistent storage device would not have any data dependencies on any portion not already in the persistent storage device and can therefore be restored from the persistent storage device during disaster recovery.

A method of storing data into a cache and maintaining write order numbers that indicate orders of writes into the cache, according to an embodiment, includes the steps of receiving a request to write data into the cache, identifying one or more lines in the cache for storing the data, writing the data into the one or more lines of the cache, and storing the same write order number for each of the one or more lines of the cache. Write order numbers are incremented each time a new write request is received and data stored in the cache pursuant to subsequent write requests will be associated with larger write order numbers.

A method of partially flushing a cache having cache lines associated with write order numbers that indicate orders of writes into the cache, according to an embodiment, includes the steps of identifying one or more lines in the cache that are associated with either a selected write order number or a write order number that is less than the selected write order number, and flushing data stored in the identified lines to a persistent storage device. The selected write order number is "selected" from a set of write order numbers, where any of the write order numbers in the set may be used to determine the lines of cache that need to be flushed together to achieve write order consistency of the image that is stored in the persistent storage device. Further embodiments include, without limitation, a non-transitory computer-readable storage medium that includes instructions that enable a processing unit to implement the above methods as well as a computer system configured to implement the above methods.

DETAILED DESCRIPTION

Figure 1:
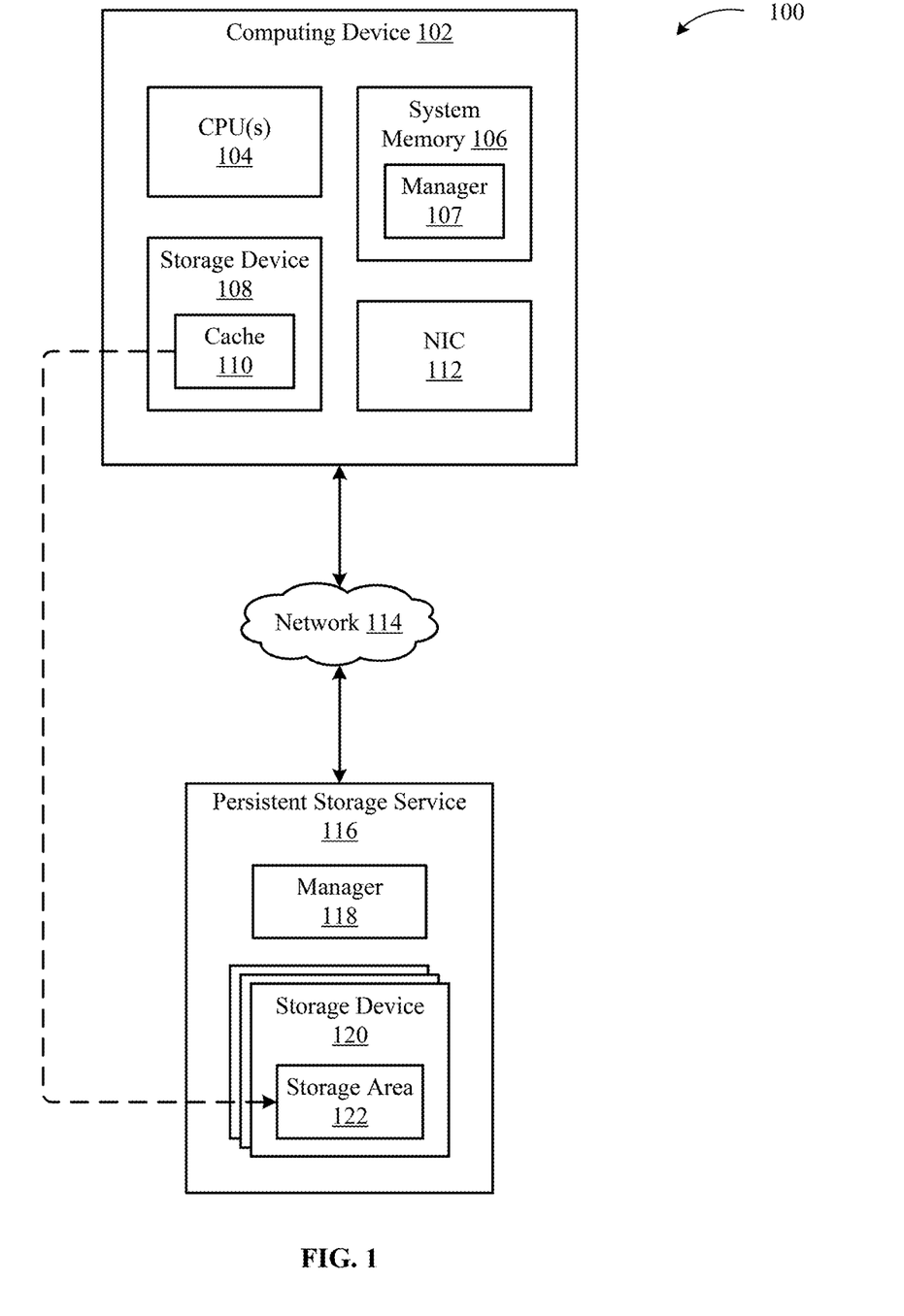
FIG. 1 is a block diagram of a system in which one or more embodiments can be practiced.

FIG. 1 is a block diagram of a system 100 in which one or more embodiments can be practiced. As shown, the system 100 includes computing device 102 and persistent storage service 116, which are in communication with one another via network 114 (e.g., the Internet). Computing device 102 may be a computer workstation, personal computer, or any other device suitable for implementing embodiments of the invention described herein. It should be recognized that the computing device 102 shown in FIG. 1 is merely illustrative and that variations and modifications are possible.

Computing device 102 includes conventional components of a computing device, which include one or more central processing units (CPUs) 104, system memory 106, a storage device 108 (e.g., hard disk drive), and a network interface controller (NIC) 112. Input/output devices (not shown) are also typically attached to computing device 102, e.g., a keyboard, a pointing device, and a display device. FIG. 1 conceptually illustrates a cache 110 included within storage device 108, which is an area of memory within storage device 108 that is set aside as a cache for storing data of read/write requests from applications executing on computing device 102. As will be described in further detail below, a manager 107, which is a software module stored in system memory 106 and executing on CPUs 104, is implemented to manage cache 110 and execute periodic partial flushes of data stored therein to persistent storage service 116.

Persistent storage service 116 includes a plurality of storage devices 120, which are managed by a manager 118. In one embodiment, the storage devices 120 are configured as Storage Area Network (SAN) devices or Network Attached Storage (NAS) devices. As shown, storage device 120 includes a storage area 122 to which contents of cache 110 are flushed. Storage area 122 may be a protected partition within storage device 120, or any suitable logical storage area that acts as a container for receiving and storing data. In one embodiment, cache 110 and storage area 122 are sized with the same storage capacity so that a common address space can be shared between the two.

As will be described in further detail below, manager 118 receives partial flush requests from manager 107, each such partial flush request specifying one or more lines of cache 110 whose data are to be stored in corresponding lines of storage area 122. Manager 118, after receiving and storing the data, sends an acknowledgement back to manager 107 to indicate that the partial flush request was successfully handled. In turn, manager 107 marks the specified one or more lines of cache 110 as "free," i.e., safe for new data to be written therein. Embodiments described herein ensure that all partial flushes are executed in manner that results in the partially flushed data stored in storage area 122 being "write order consistent," i.e., they do not have data dependencies on data that are not stored in storage area 122.

Figure 2A:
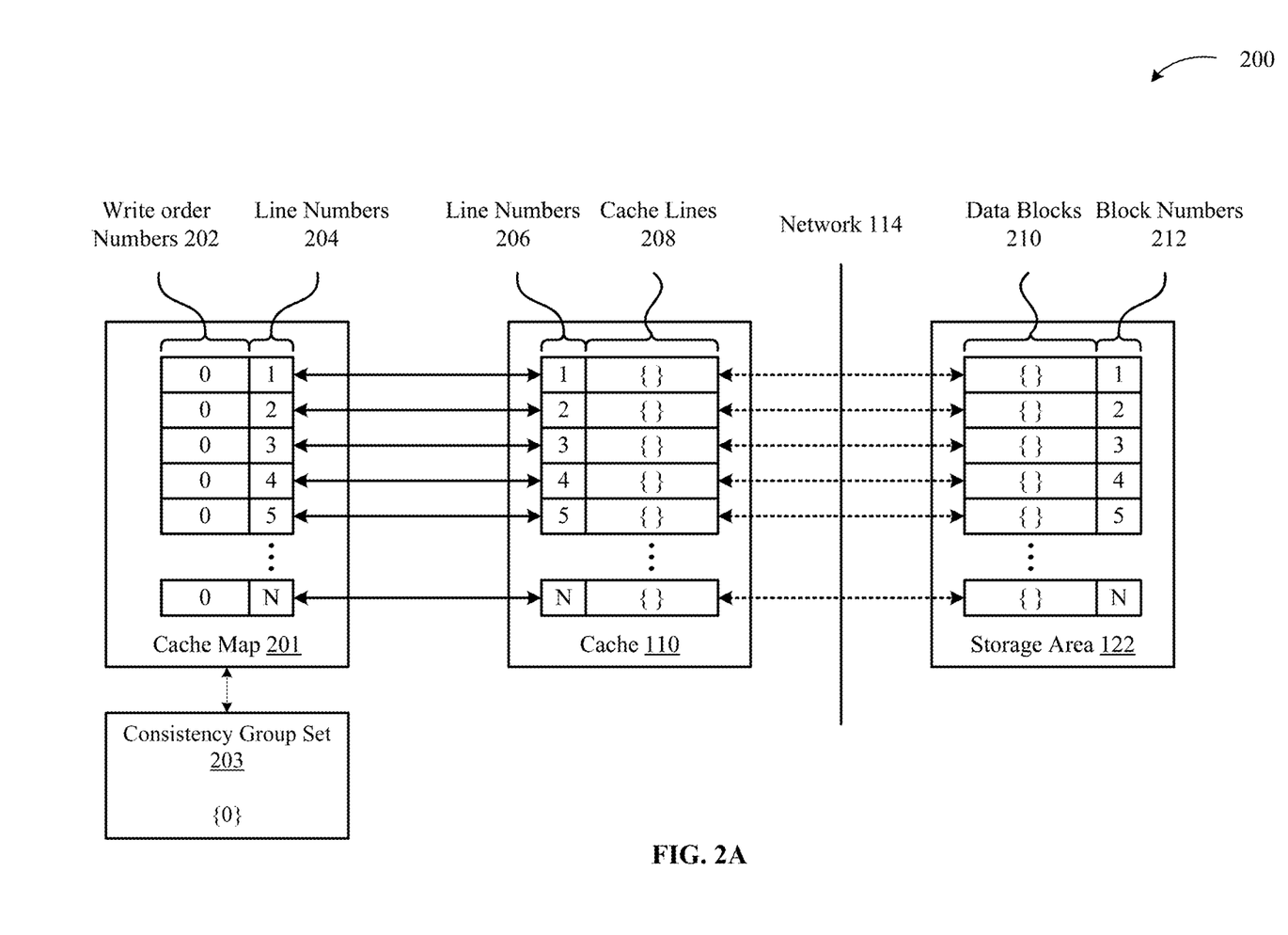
FIGS. 2A-2G illustrate writes of data into lines of a cache as well as an execution of a partial flush of the cache based on a write order number, in accordance with one or more embodiments.

FIGS. 2A-2G illustrate the process of writing data into lines of cache 110 and partially flushing cache 110 based on write order numbers, in accordance with one or more embodiments. FIG. 2A illustrates the initial state of various components at the beginning of the process. As shown, cache 110 is configured to include N cache lines 208, which, in one embodiment, are configured to have the same data storage capacity. For example, if cache 110 has one thousand lines and is sized to be one gigabyte, then each cache line 208 would have the capacity to store one megabyte of data.

Also shown in FIG. 2A is a cache map 201, which is managed by manager 107 and includes entries that correspond to cache lines 208. In particular, each of the line numbers 204 in cache map 201 has a matching line number 206 in cache 110, and is associated with a write order number 202. As further described in detail below, write order numbers 202 are used to track the order in which data is written into cache lines 208 of cache 110. Manager 107 writes data into cache lines 208 of cache 110 in response to receiving a direct request to write data into cache 110, which is referred to herein as a "dirty write" since the data being written into the cache is not write order consistent with storage area 122. However, manager 107 also writes data into cache lines 208 of cache 110 in response to receiving a request to read data out of cache 110 that is not stored in cache 110 at the time the read request is received. In particular, manager 107 retrieves from storage area 122 the data specified in the read request and then and writes that data into cache 110, which is referred to herein as a "clean write" since storage area 122 continues to store the same data and that data is write order consistent.

Values of write order numbers 202 are updated when data is written into cache lines 208 or data is cleared from cache lines 208 (e.g., when a flush is executed). In one embodiment, all write order numbers 202 in cache map 201 are initially assigned a value of 0 to indicate that corresponding cache lines 208 are "clean" and do not have any data stored therein. After operations (e.g., dirty/clean write requests, partial flushes, etc.) have been executed at cache 110, a write order number of 0 for a cache line 208 may instead indicate that data stored in that cache line 208 is the same data that is stored in a corresponding data block included in storage area 122. This occurs when manager 107 executes a clean write of data into cache lines 208 of cache 110 and sets their corresponding write order numbers 202 to a value of 0. When cache 110 receives dirty write requests, values of write order numbers 202 are incremented for each such dirty write request. A counter may be used to perform the incrementing. In an alternative embodiment, write order numbers 202 are assigned timestamp values. In a further embodiment, write order numbers 202 are initialized at a large pre-defined value instead of the value 0, e.g., 10,000, and the counter is decremented each time a dirty write request is processed.

FIG. 2A also shows a consistency group set 203 that includes one or more write order numbers that are used to perform partial flushing of cache 110 in a write order consistent manner. Write order numbers are added to and removed from consistency group set 203 when dirty write requests are handled and when partial flushes of cache 110 are executed, respectively. The complete set of write order numbers stored in consistency group set 203 informs manager 107 of all of the different ways partial flushes of cache 110 can be executed in a write order consistent manner. For example, if manager 107 selects one of the write order numbers from consistency group set 203 in connection with a partial flush of cache 110, then any data stored in cache lines 208 that are associated with a write order number that is equal to or less than the selected write order number (except for 0) will be flushed together to storage area 122 for write order consistency to be maintained.

As further illustrated in FIG. 2A, storage area 122 includes data blocks 210 and block numbers 212. In the illustrated embodiment, data blocks 210 each have the same size as cache lines 208, and block numbers 212 correspond to line numbers 206 of cache 110. As such, there is a one-to-one correspondence between cache lines 208 and data blocks 210.

Figure 2B:
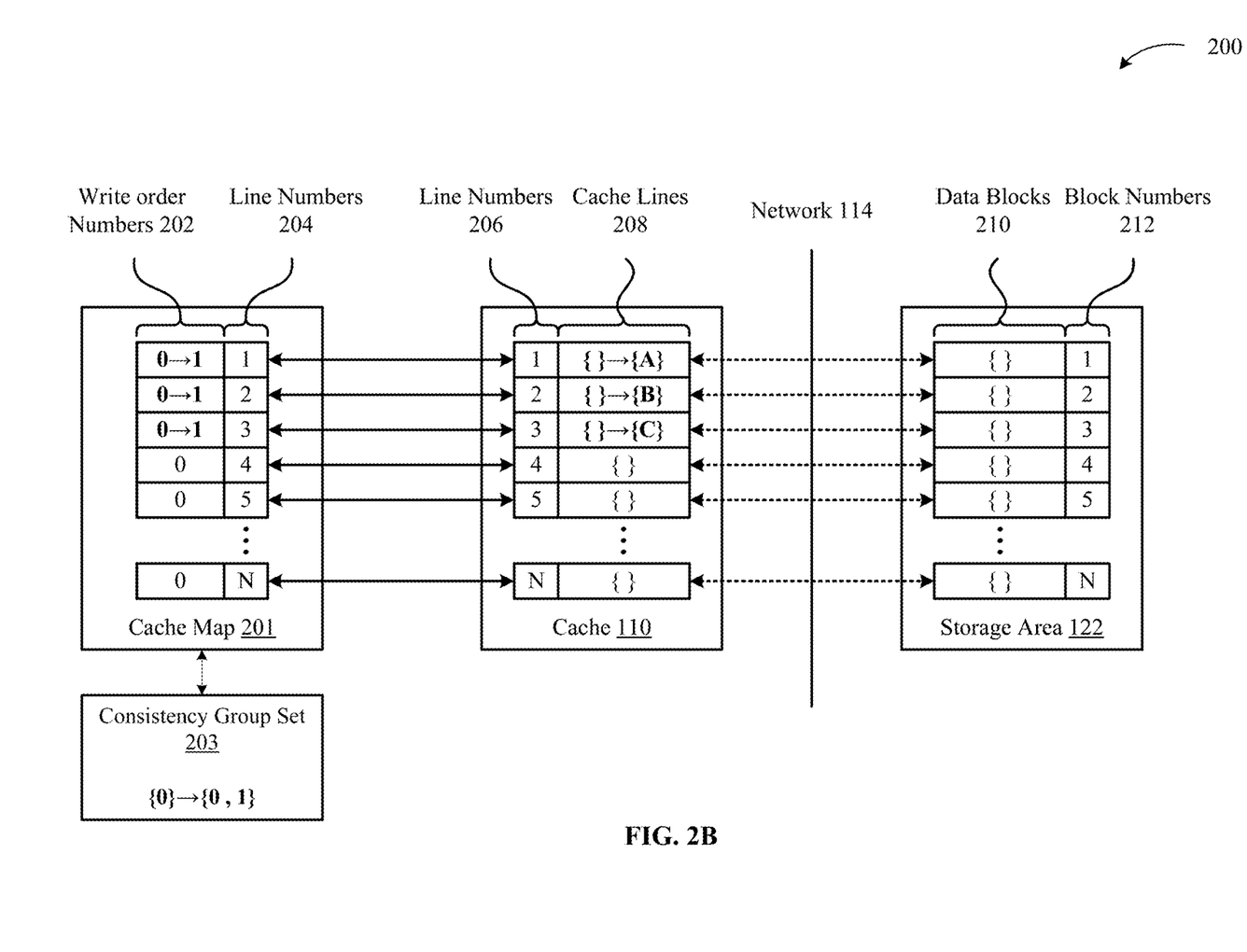

FIG. 2B illustrates an example where manager 107 receives a dirty write request to write A, B, and C (each assumed to be one megabyte in size in this example) into cache 110. In response to receiving the dirty write request, manager 107 parses cache map 201 to identify cache lines 208 that are associated with a write order number of 0, i.e., cache lines 208 that are "clean." First, second, and third cache lines 208 are identified as being clean. Thereafter, manager 107 writes A into the first cache line (e.g., line number 206-1), writes B into the second cache line (e.g., line number 206-2), and writes C into the third cache line (e.g., line number 2063). Manager 107 also sets the values of corresponding write order numbers 202 to a value equal to that of the counter which, in the example, is currently 1 (indicating that this is the first dirty write request after cache 110 has been initialized). Finally, manager 107 updates consistency group set 203 to include the value of 1, which indicates that, if the data stored in all cache lines 208 associated with the write order number 1 is flushed to storage area 122, then that data will be write order consistent. The value of the counter that is used to track the write order number is then incremented by manager 107 to a value of 2 in preparation for handling a subsequent write request.

Figure 2C:
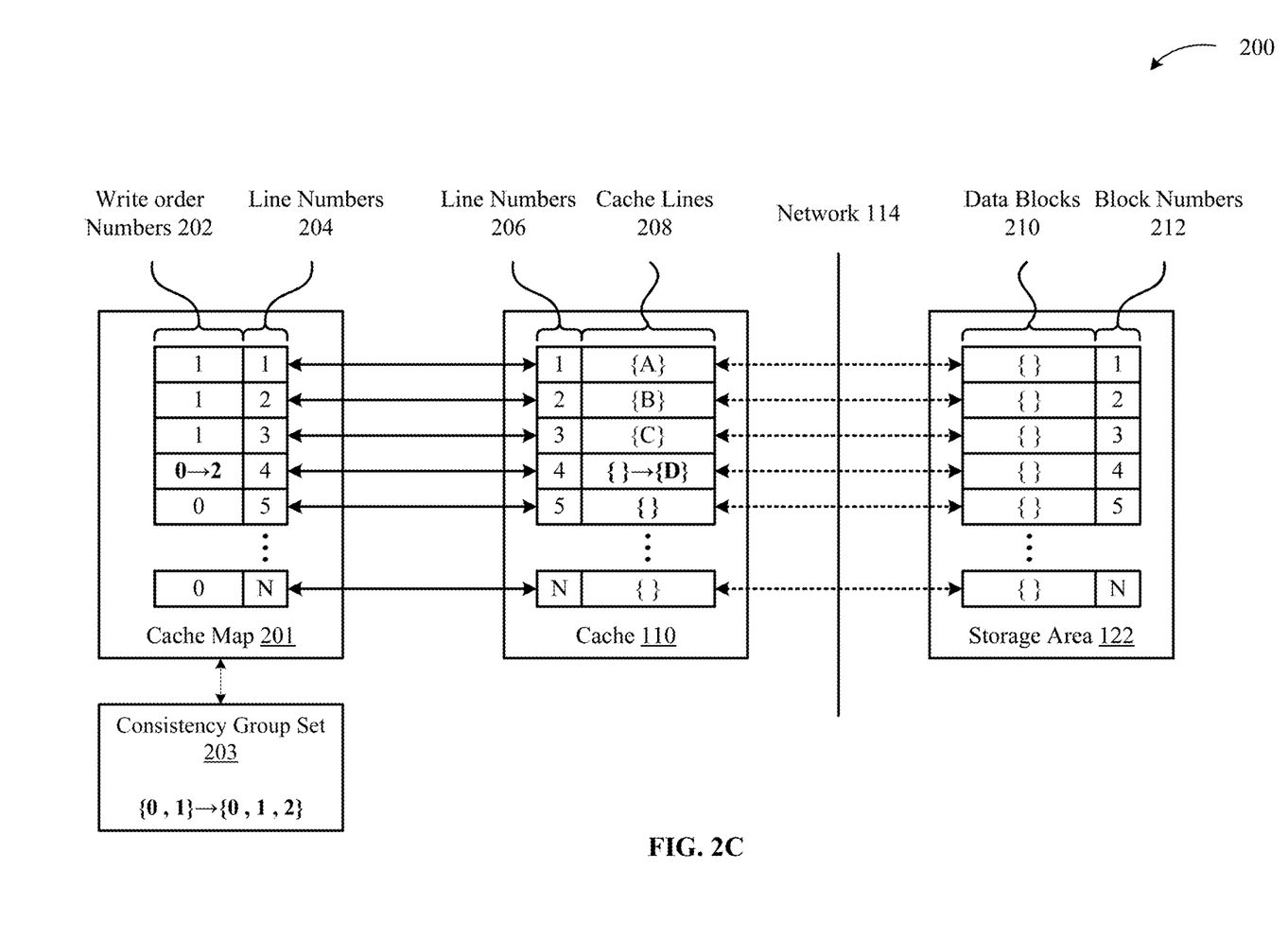

FIG. 2C illustrates an example where manager 107 receives a dirty write request subsequent to the dirty write request described above in conjunction with FIG. 2B. This subsequent dirty write request is to write D into cache 110. D is assumed to be one megabyte in size. As shown, in response to receiving the dirty write request, manager 107 selects the fourth cache line (e.g., line number 206-4) for the write. Manager 107 also sets the value of corresponding write order number 202 to be equal to the current counter value of 2. Finally, manager 107 updates the consistency group set 203 to include the value of 2, and increments the counter value to 3 in preparation for handling a subsequent write request.

At this point, consistency group set 203 includes the values {1, 21. This indicates to manager 107 that: (1) if the data stored in all cache lines 208 associated with the write order number 1 is flushed to storage area 122, then that data, collectively, are write order consistent within storage area 122; or (2) if the data stored in all cache lines 208 associated with the write order numbers that are 2 or less (e.g., write order numbers 2, 1) are flushed to storage area 122, then that data, collectively, are write order consistent within storage area 122. On the other hand, if manager 107 were to flush only the data stored in cache lines 208 associated with the write order number 2 (and not cache lines 208 associated with the write order number 1), then write order consistency of that data is compromised since the data stored in the fourth cache line 208 (i.e., D) might depend on the data stored in the first, second or third cache lines 208 (i.e., A, B, and C, respectively), since the data stored in the first, second and third cache lines was written into cache 110 before D was written into cache 110. Thus, if only D was flushed to storage area 122 and cache 110 failed immediately thereafter, it should be recognized that the data stored in storage area 122 is potentially write order inconsistent because D may depend on A, B, and/or C, which are not stored in storage area 122. Accordingly, in order to maintain data consistency within storage area 122, manager 107 is configured to simultaneously flush out any data within cache lines 208 that are associated with a selected write order number (e.g., 2) as well as any data stored in cache lines 208 that are associated with a write order number whose value is less than the selected write order number (e.g., 1).

Figure 2D:
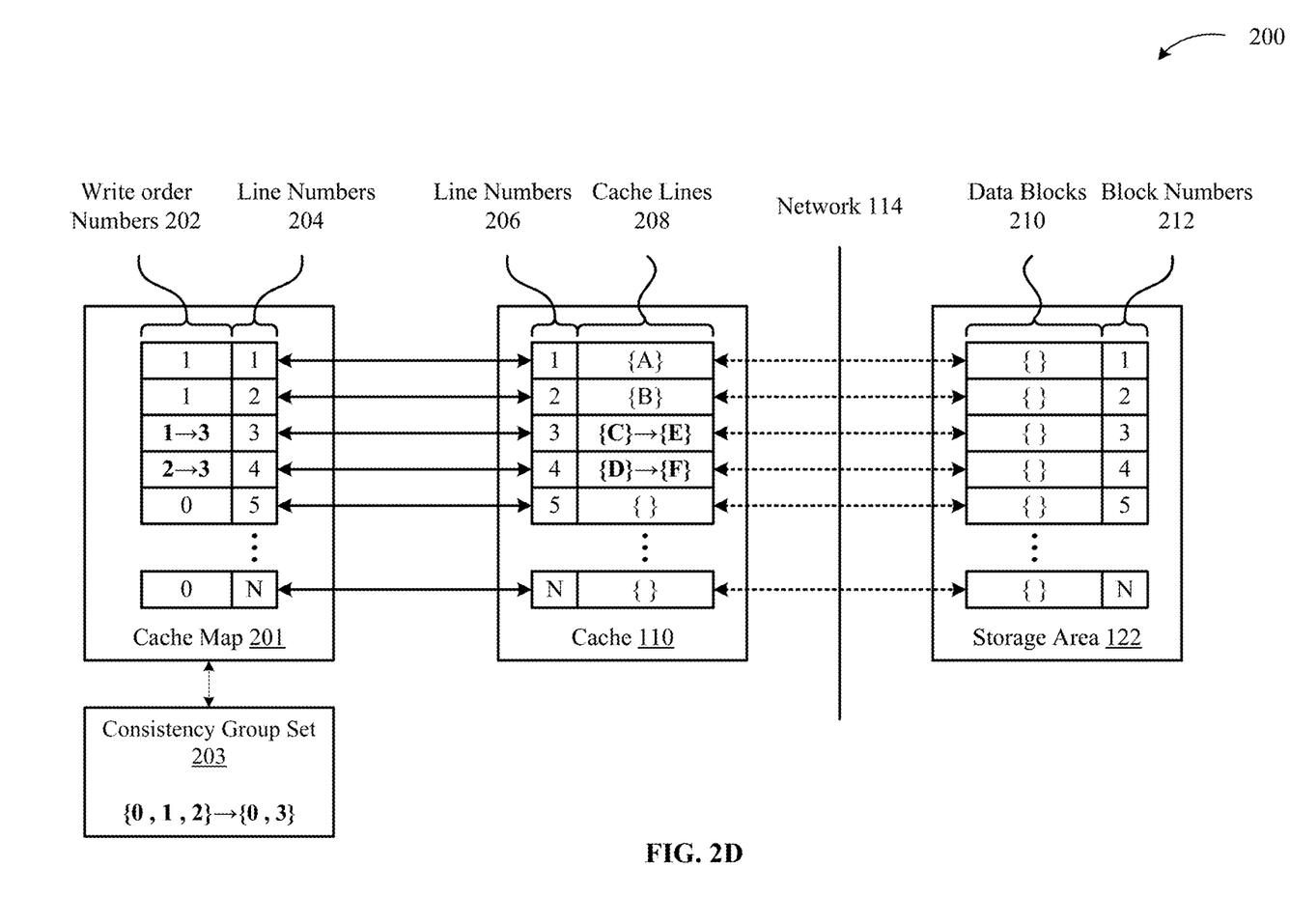

FIG. 2D illustrates an example where manager 107 receives a dirty request to write EF into cache 110, where EF is two megabytes in size. In response to receiving the dirty write request, manager 107 chooses to write the first half of EF into the third cache line (e.g., line number 206-3) to replace C, and writes the second half of EF into the fourth cache line (e.g., line number 206-4) to replace D. Manager 107 also sets the values of corresponding write order numbers 202 to be equal to the counter value which is 3. Manager 107 then increments the counter value to a value of 4 in preparation for handling a subsequent write request.

In addition, manager 107 updates consistency group set 203 according to the changes made to the third and fourth cache lines. Since the third cache line—which previously stored data associated with write order number 1—now stores data associated with the write order number 3, a partial flush based on only write order number 1 would be inconsistent, since part of the data associated with the write order number 1 has been overwritten. Similarly, since the fourth cache line 208—which previously stored data associated with write order number 2—now stores data associated with the write order number 3, a partial flush based on only write order number 2 is also invalid, since there are no longer any cache lines 208 that are associated with the write order number 2. Accordingly, manager 107 removes the values 1 and 2 from consistency group set 203, and then adds the value 3 to consistency group set 203. The resulting consistency group set 203 includes the values {0, 3}, which indicates to manager 107 that, if all the data stored in cache lines 208 associated with the write order number 3—along with all the data stored in cache lines 208 associated with a write order number that is less than 3 (e.g., the first and second cache lines, which are each associated with the write order number 1)—are flushed to storage area 122, then that data, collectively, are write order consistent within the storage area 122.

Figure 2E:
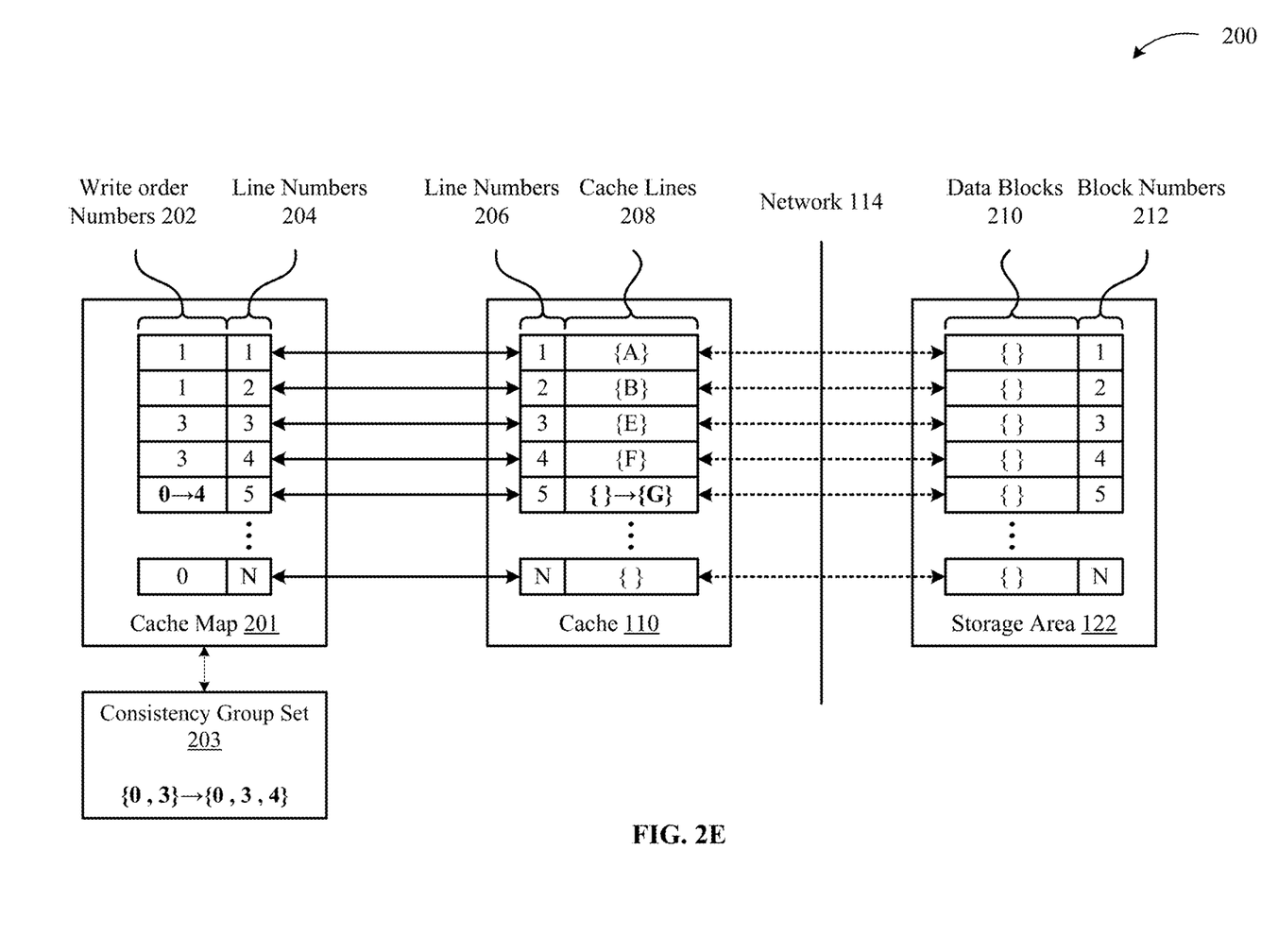

FIG. 2E illustrates an example where manager 107 receives a dirty write request to write G into cache 110, where G is one megabyte in size. In response to receiving the dirty write request, manager 107 selects the fifth cache line (e.g., line number 206-5) for the write. Manager 107 also sets the value of the corresponding write order number 202 to be equal to the counter value of 4. Finally, manager 107 updates the consistency group set 203 to include the value 4, and increments the counter value that is used to track the write order number to 5 in preparation for handling a subsequent write request.

At this point, consistency group set 203 includes the values {0, 3, 4}. This indicates to manager 107 that: (1) if the data stored in all cache lines 208 associated with the write order number 3 along with the data stored in all cache lines associated with write order numbers less than 3 (e.g., the first and second cache lines, which are associated with the write order number 1)—are flushed to storage area 122, then that data, collectively, are write order consistent within the storage area 122, or (2) if the data stored in all cache lines 208 associated with the write order number 4—along with the data stored in all cache lines associated with write order numbers less than 4 (e.g., the first, second, third and fourth cache lines)—are flushed to storage area 122, then that data, collectively, are write order consistent within the storage area 122.

Figure 2F:
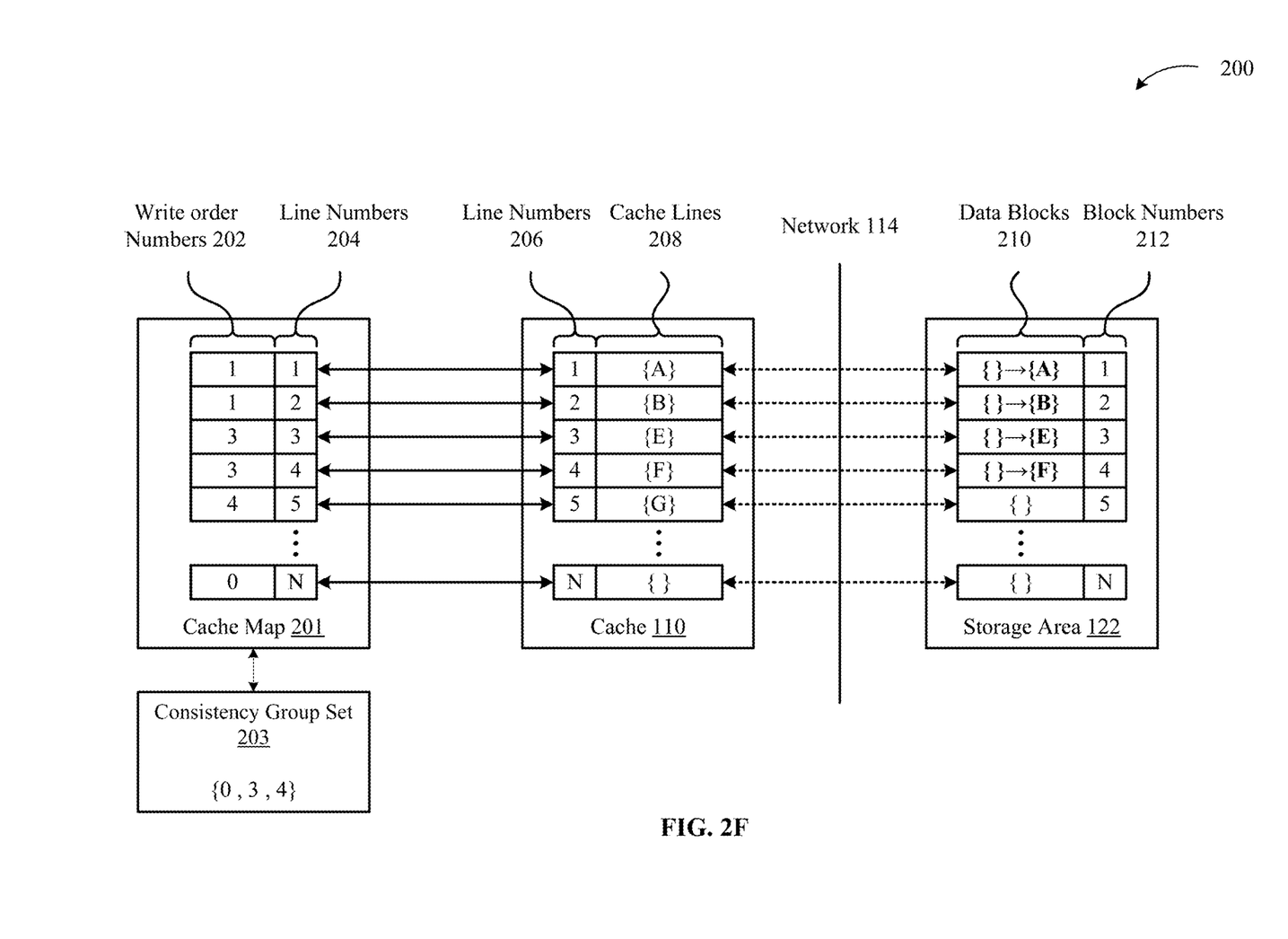

When the available number of clean cache lines 208 (i.e., cache lines 208 associated with a write order number 0) in cache 110 begins to diminish, manager 107 may choose to execute a partial flush of cache 110, an example of which is illustrated in FIG. 2F. In particular, FIG. 2F illustrates manager 107 executing a partial flush based on the write order number 3 retrieved from consistency group set 203, which, as described above, involves flushing the data stored in the first, second, third and fourth cache lines 208 to storage area 122. Manager 118 receives a flush request issued by manager 107, and, if manager 118 deems that the flush request is permissible, then manager 107 begins transmitting to manager 118 the data stored in the first, second, third and fourth cache lines 208. In one embodiment, manager 118 mandates that the flush request be handled atomically, i.e., the flush is cancelled if any part of the data specified by the flush request is not stored successfully into storage area 122. Accordingly, manager 118 is configured to follow-up with manager 107 and indicate whether the flush was successful (e.g., via an acknowledgement (ACK)) or whether the flush failed. In the event of a flush failure, manager 107 may re-attempt the same flush at a later time or may attempt a new flush based on a different write order number.

In the example shown in FIG. 2F, the data stored in the first, second, third and fourth cache lines 208 are successfully transmitted and stored into corresponding data blocks 210 of storage area 122, and, consequently, manager 118 issues to manager 107 an ACK that indicates to manager 107 that the flush was successful. Accordingly, manager 107 updates cache map 201 and consistency group set 203, which is described below in conjunction with FIG. 2G.

Figure 2G:
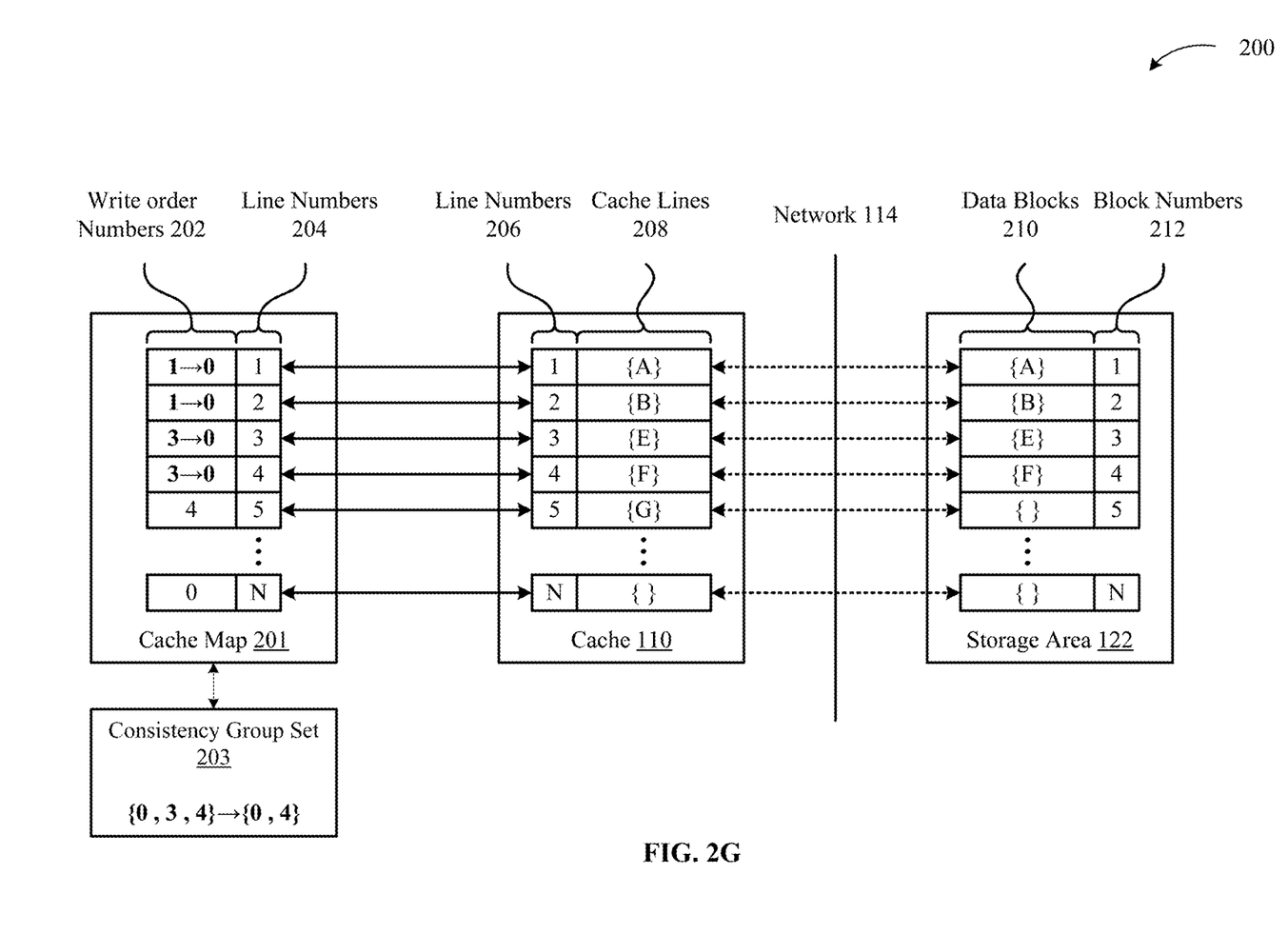

As shown in FIG. 2G, storage area 122 stores a copy of the data included in the first, second, third and fourth cache lines 208, which is write order consistent data that can be read out in usable form from the storage area 122 in the event of a cache 110 failure. After receiving the ACK, manager 107 associates the first, second, third and fourth cache lines 208 with write order number 0 since the data stored in the first, second, third and fourth cache lines 208 can now be overwritten without compromising the write order consistency of the data stored in storage area 122. Manager 107 also updates consistency group set 203 and removes the value 3, such that a partial flush based on the write order number 4 is now the only valid flush that manager 107 may choose to execute.

Figure 3A:
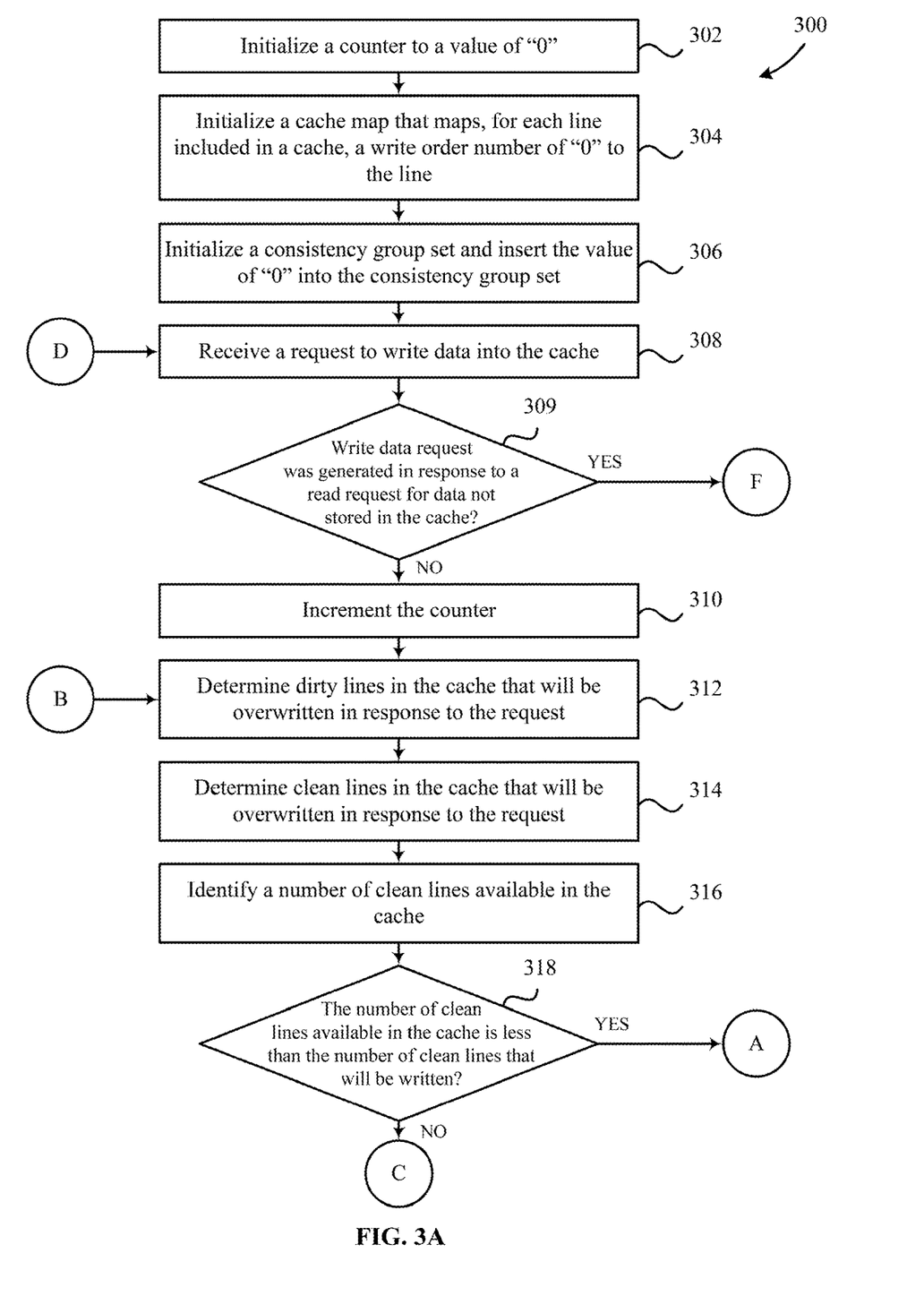
FIGS. 3A-3C illustrate a flow diagram of a method for managing and tracking the write order of lines in a cache as well as executing partial flushes of the cache, according to one embodiment.
Figure 3B:
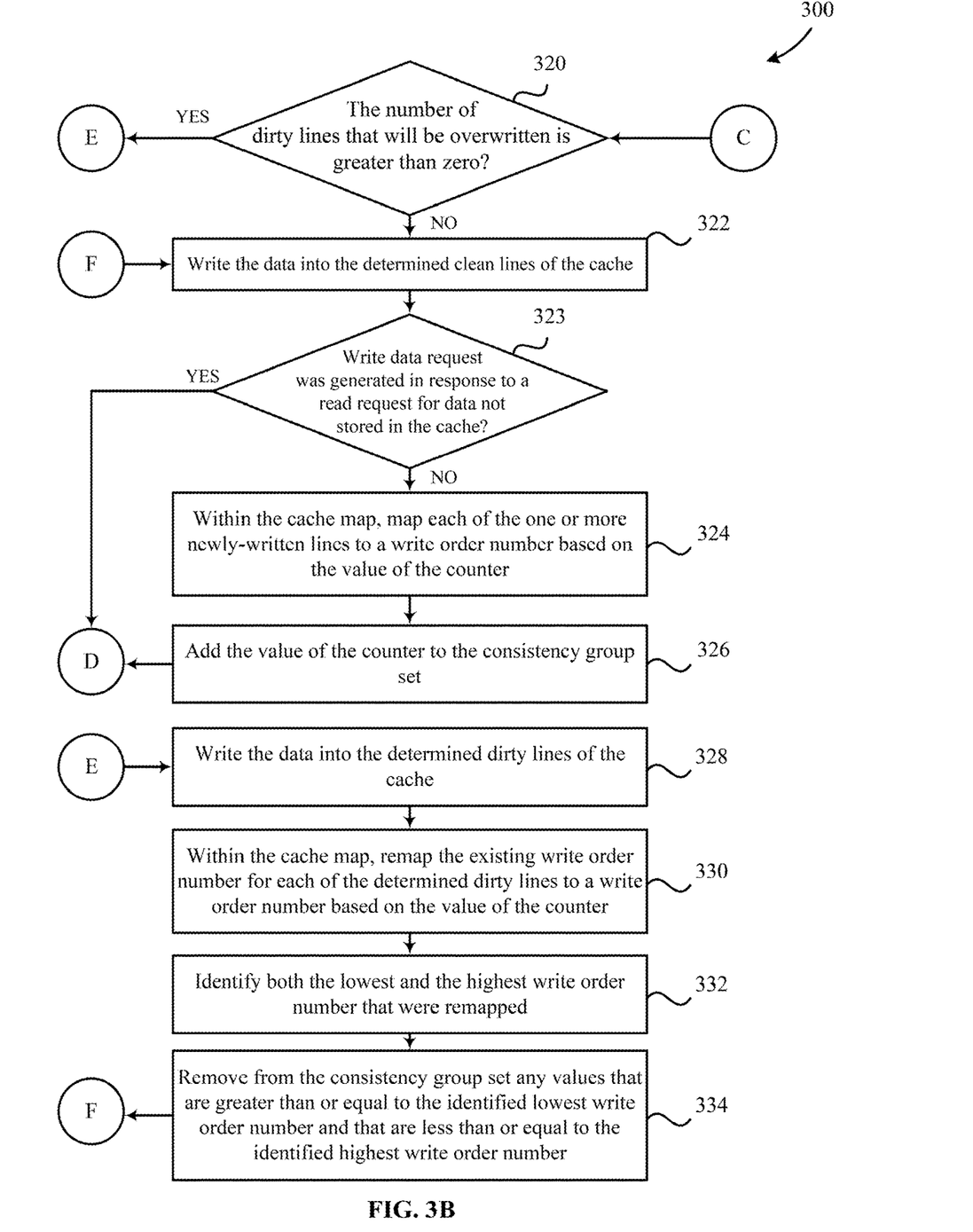
Figure 3C:
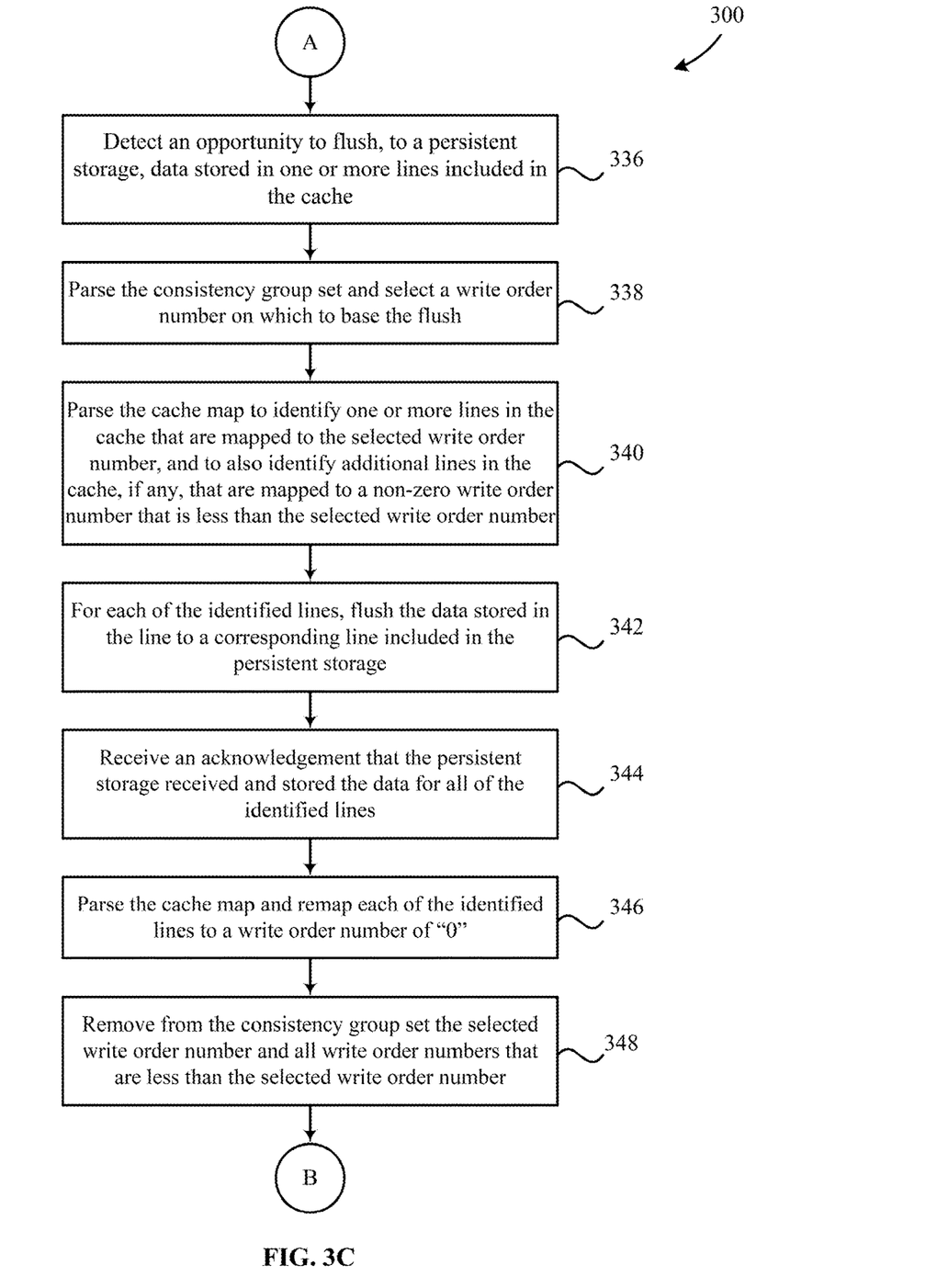

FIGS. 3A-3C illustrate a flow diagram of a method 300 for managing and tracking the write order of lines in a cache as well as executing partial flushes of the cache, according to one embodiment. As shown in FIG. 3A, method 300 begins at step 302, where manager 107 initializes a counter to a value of 0. At step 304, manager 107 initializes a cache map (e.g., cache map 201) that maps, for each line included in a cache (e.g., cache 110), a write order number of 0 to the line. At step 306, manager 107 initializes a consistency group set (e.g., consistency group set 203) by inserting the value of 0 into the consistency group set.

At step 308, manager 107 receives a request to write data into the cache, which, as described above, may be a dirty write request, or a clean write request that is generated in response to a read request for data not stored in the cache. At decision block 309, manager 107 determines whether the write data request received at step 308 was generated in response to a read request for data that is not stored in the cache, i.e., a clean write request. If, at decision block 309, manager 107 determines that the write data request was not generated in response to a read request for data that is not stored in the cache, i.e., it is a dirty write request, then method 300 proceeds to step 310. At step 310, and in response to receiving the dirty write request, manager 107 increments the counter. At step 312, manager 107 determines dirty lines (i.e., cache lines mapped to a non-zero write order number) in the cache that will be overwritten, if any, in response to the request. At step 314, manager 107 also determines clean lines (i.e., cache lines mapped to the write order number 0) in the cache that will be overwritten, if any, in response to the request. At step 316, manager 107 identifies a number of clean lines that are available in the cache.

At decision block 318, manager 107 determines whether the identified number of clean lines available in the cache is less than the number of clean lines that will be overwritten (as determined at step 314). If, at decision block 318, manager 107 determines that the identified number of clean lines available in the cache is not less than the number of clean lines that will be overwritten, then method 300 proceeds to decision block 320.

At decision block 320 (illustrated in FIG. 3B), manager 107 determines whether the number of dirty lines that will be overwritten (as determined at step 312) is greater than zero. If, at decision block 320, manager 107 determines that the number of dirty lines that will be overwritten is not greater than zero, then method 300 proceeds to step 322, where manager 107 writes the data into the determined clean lines of the cache. Decision block 323 mirrors decision block 309 described above such that manager 107 executes step 324 if the write data request received at step 308 was not generated in response to a read request for data that is not stored in the cache, i.e., it is a dirty write request. Otherwise, manager 107 handles the clean write data request at step 322 and returns to step 308 to handle the next write request that is received. At step 324, manager 107 maps, within the cache map, each of the one or more newly-written lines to a write order number based on the value of the counter. At step 326, manager 107 adds the value of the counter to the consistency group set. Thus, after step 326, the write request received at step 308 has been processed, and method 300 returns to step 308 to handle the next write request that is received.

Referring back now to decision block 309, if manager 107 determines that the write data request was in fact generated in response to a read request for data that is not stored in the cache, i.e., it is a clean write request, then method 300 proceeds to step 322, which is executed as described above.

Referring back now to decision block 320, if manager 107 determines that the number of dirty lines that will be overwritten is greater than zero, then method 300 proceeds to step 328, which is illustrated in FIG. 3B. At step 328, manager 107 writes the data into the determined dirty lines of the cache. At step 330, manager 107 remaps, within the cache map, the existing write order number for each of the determined dirty lines to a write order number based on the value of the counter. At step 332, manager 107 identifies both the highest and lowest write order numbers that were remapped at step 330. At step 334, manager 107 removes from the consistency group set any values that are greater than or equal to the identified lowest write order number and that are less than or equal to the identified highest write order number. Method 300 then proceeds back to step 322, which is executed as described above.

Referring back now to decision block 318, if manager 107 determines that the identified number of clean lines available in the cache is less than the number of clean lines that will be overwritten (as determined at step 314), then method 300 proceeds to step 336, which is illustrated in FIG. 3C.

At step 336, manager 107 detects an opportunity to flush, to a persistent storage (e.g., storage area 112 in persistent storage device 116), data stored in one or more lines included in the cache. According to method 300, step 336 is reached when the cache is too full to store the data in the write request received at step 308, and, therefore, existing data stored in lines of the cache must be flushed out to persistent storage in order to create free space in the cache that is required to process the received write request. Accordingly, at step 338, manager 107 parses the consistency group set and selects a write order number on which to base the partial cache flush. At step 340, manager 107 parses the cache map to identify one or more lines in the cache that are mapped to the selected write order number, and to also identify one or more lines, if any, in the cache that are mapped to a non-zero write order number that is less than the selected write order number.

At step 342, manager 107, flushes, for each of the identified lines, the data stored therein to a corresponding line included in the persistent storage. At step 344, manager 107 receives an acknowledgement that the persistent storage received and stored the data for all of the identified lines. At step 346, manager 107 parses the cache map and remaps each of the lines identified at step 406 to a write order number of 0. At step 348, manager 107 removes from the consistency group set the selected write order number and all write order numbers that are less than the selected write order number. Method 300 then proceeds back to step 312, whereupon subsequent method steps 300 are executed in order to process the write request received at step 308.

In addition, manager 107 may choose to periodically execute method steps 336348 in order to prevent the cache from becoming too full and delaying execution of write requests. In one embodiment, manager 107 periodically executes, e.g., based on a timer, a partial flush of the cache according to method steps 336-348 in attempt to reduce the frequency of situations where the cache is too full to receive new data. In another embodiment, manager 107 executes a partial flush of the cache when a threshold value of available storage capacity has been reached, e.g., when the available storage capacity of the cache falls under fifty percent.

Embodiments provide various advantages over conventional approaches that are typically used to manage a cache that is disposed between a computing device and a persistent storage service. As previously set forth herein, conventional caching techniques, when working with large files (e.g., virtual disks), suffer from the atomicity of data transfers mandated by persistent storage services since Internet connections are often slow and/or unreliable. As a solution to this problem, the techniques described herein enable data (e.g., a virtual disk) stored in local cache to be partially flushed-out to a persistent storage service, which enables more-frequent backups of data to the persistent storage service. Moreover, the techniques described herein ensure that the data flushed-out is write order consistent, i.e., the data does not depend on any other data, and can therefore be read out of the persistent storage service in a usable format in the event that the local cache unexpectedly fails. As a result, the various benefits of persistent storage services can be exploited without sacrificing the backup frequency and/or reliability that is afforded by the otherwise expensive and complex locally-accessible enterprise storage devices.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that foirii part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

Therefore, the following is claimed:

1. A system for storing data in a cache and maintaining write order consistency for data stored in the cache, the system comprising:
   at least one computing device comprising the cache, a cache map, and a consistency group set that is different from the cache map, the cache map comprising a write order number entry identifying a respective write order number that is mapped to a cache line entry indicating a respective cache line of a plurality of cache lines in the cache, and the consistency group set comprising a set of non-duplicated write order numbers used to indicate different variations of flushes that can be executed to maintain write order consistency, wherein at least two cache lines of the plurality of cache lines correspond to a same write order number;

at least one application executable on the at least one computing device, wherein when executed, the at least one application causes the at least one computing device to at least:

receive a request to write data into the cache;

update a value of a write order counter;

determine a cache line to be overwritten in response to the request;

write the data in the cache line;

replace a first write order number associated with the cache line with a second write order number, the second write order number being the value of the write order counter; and update the set of non-duplicated write order numbers included in the consistency group set by at least one of: removing a write order number from the consistency group set or adding a write order number to the consistency group set.

2. The system of claim 1, wherein updating the set of write order numbers in the consistency group set comprises:

removing any write order numbers that are greater than or equal to an identified lowest write order number and are less than or equal to an identified highest write order number; and adding the updated value of the write order counter to the consistency group set.

3. The system of claim 1, wherein updating the value of the write order counter comprises incrementing the value or decrementing the value.

4. The system of claim 1, wherein, when executed, the at least one application further causes the at least one computing device to at least:

determine to execute a partial cache flush;

select a write order number included in the consistency group set; and execute the partial cache flush to persistent storage based on the selected write number.

5. The system of claim 4, wherein, when executed, the at least one application further causes the at least one computing device to at least:

remove the selected write order number and all write order numbers that are less than the selected write order number from the consistency group set.

6. The system of claim 4, wherein, when executed, that at least one application further causes the at least one computing device to at least:

parse the cache map to identify one or more cache lines in the cache that are at least one of: mapped to the selected write order number or mapped to a non-zero write order number that is less than the selected write order number, the partial cache flush including the identified one or more cache lines.

7. The system of claim 1, wherein a third cache line of the cache is associated with a different write order number than the at least two cache lines.

8. A method for storing data in a cache and maintaining write order consistency for data stored in the cache, the method comprising:

receiving, by a computing device, a request to write data into the cache, the cache being associated with a cache map and a consistency group set that is different from the cache map, the cache map comprising a write order number entry identifying a respective write order number that is mapped to a cache line entry indicating a respective cache line of a plurality of cache lines in the cache, and the consistency group set comprising a set of non-duplicated write order numbers used to indicate different variations of flushes that can be executed to maintain write order consistency, wherein at least two cache lines of the plurality of cache lines correspond to a same write order number;

updating, by the computing device, a value of a write order counter;

determining, by the computing device, a cache line to be overwritten in response to the request;

writing, by the computing device, the data to the cache line;

replacing, by the computing device, a first write order number associated with the cache line with a second write order number, the second write order number being the value of the write order counter; and updating, by the computing device, the set of non-duplicated write order numbers included in the consistency group set by at least one of: removing a write order number from the consistency group set or adding a write order number to the consistency group set.

9. The method of claim 8, wherein updating the set of write order numbers in the consistency group set comprises:

removing any write order numbers that are greater than or equal to an identified lowest write order number and are less than or equal to an identified highest write order number; and adding the updated value of the write order counter to the consistency group set.

10. The method of claim 8, wherein updating the value of the write order counter comprises incrementing the value or decrementing the value.

11. The method of claim 8, further comprising:

determining to execute a partial cache flush;

selecting a write order number included in the consistency group set; and executing the partial cache flush to persistent storage based on the selected write number.

12. The method of claim 11, wherein updating the set of write order numbers comprises removing the selected write order number and all write order numbers that are less than the selected write order number from the consistency group set.

13. The method of claim 11, wherein, when executed, that at least one application further causes the at least one computing device to at least:

parse the cache map to identify one or more cache lines in the cache that are at least one of: mapped to the selected write order number or mapped to a non-zero write order number that is less than the selected write order number, the partial cache flush including the identified one or more cache lines.

14. The method of claim 8, wherein a third cache line of the cache is associated with a different write order number than the at least two cache lines.

15. A non-transitory computer-readable medium embodying executable instructions for storing data in a cache and maintaining write order consistency for data stored in the cache, which, when executed by a processor, the executable instructions cause at least one computing device to at least:

receive a request to write data into the cache, the cache being associated with a cache map and a consistency group set that is different from the cache map, the cache map comprising a write order number entry identifying a respective write order number that is mapped to a cache line entry indicating a respective cache line of a plurality of cache lines in the cache, and the consistency group set comprising a set of non-duplicated write order numbers used to indicate different variations of flushes that can be executed to maintain write order consistency, wherein at least two cache lines of the plurality of cache lines correspond to a same write order number;

update a value of a write order counter;

determine a cache line to be overwritten in response to the request;

write the data to the cache line;

replace a first write order number associated with the cache line with a second write order number, the second write order number being the value of the write order counter; and update the set of non-duplicated write order numbers included in the consistency group set by at least one of: removing a write order number from the consistency group set or adding a write order number to the consistency group set.

16. The non-transitory computer-readable medium of claim 15, wherein updating the set of write order numbers in the consistency group set comprises:

removing any write order numbers that are greater than or equal to an identified lowest write order number and are less than or equal to an identified highest write order number; and adding the updated value of the write order counter to the consistency group set.

17. The non-transitory computer-readable medium of claim 15, wherein updating the value of the write order counter comprises incrementing the value or decrementing the value.

18. The non-transitory computer-readable medium of claim 15, wherein, when executed, the executable instructions further cause the at least one computing device to at least:

determine to execute a partial cache flush;

select a write order number included in the consistency group set; and execute the partial cache flush to persistent storage based on the selected write number.

19. The non-transitory computer-readable medium of claim 18, wherein, when executed, the executable instructions further cause the at least one computing device to at least:

remove the selected write order number and all write order numbers that are less than the selected write order number from the consistency group set.

20. The non-transitory computer-readable medium of claim 18, wherein:

when executed, the executable instructions further cause the at least one computing device to at least:

parse the cache map to identify one or more cache lines in the cache that are at least one of: mapped to the selected write order number or mapped to a non-zero write order number that is less than the selected write order number, the partial cache flush including the identified one or more cache lines.

* * * * *